US012621282B2

(12) United States Patent
Lohar et al.

(10) Patent No.:  US 12,621,282 B2
(45) Date of Patent:       May 5, 2026

(54) SYSTEM AND METHOD FOR IDENTIFYING AND BLOCKING SYNTHETIC MEDIA BASED MISAPPROPRIATION ATTEMPTS ASSOCIATED WITH ELECTRONIC COMMUNICATIONS

(71) Applicant: BANK OF AMERICA CORPORATION, Charlotte, NC (US)

(72) Inventors: Sanjay Lohar, Charlotte, NC (US); George Anthony Albero, Charlotte, NC (US); Jinna Kim, Charlotte, NC (US); Olga Kocharyan, Matthews, NC (US); Timothy Scott Murphy, Charlotte, NC (US); Christopher Perez, Monroe, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 149 days.

(21) Appl. No.: 18/732,285

(22) Filed: Jun. 3, 2024

(65) Prior Publication Data

US 2025/0373591 A1      Dec. 4, 2025

(51) Int. Cl.
*H04L 9/40*          (2022.01)

(52) U.S. Cl.
CPC ................................... *H04L 63/08* (2013.01)

(58) Field of Classification Search
CPC ....................................................... H04L 63/08
See application file for complete search history.

(56) References Cited

U.S. PATENT DOCUMENTS

| | | | |
|---|---|---|---|
| 11,855,999 B1* | 12/2023 | Gurinavičiūtė | ......... H04L 63/20 |
| 2025/0061183 A1* | 2/2025 | Rathinasamy | ....... H04B 10/116 |
| 2025/0061635 A1* | 2/2025 | Dave | ..................... G09B 21/00 |

* cited by examiner

*Primary Examiner* — Benjamin A Kaplan
(74) *Attorney, Agent, or Firm* — Moore & Van Allen PLLC; Anoohya Yarlagadda

(57)          ABSTRACT

Embodiments of the present invention provide a system for identifying and blocking synthetic media based misappropriation attempts associated with electronic communications. The system is configured for identifying initiation of an authentication request from a user device of a user, monitoring and recording user characteristics via the user device, capturing user environment data of the user, via the user device, analyzing the user characteristics and the user environment data of the user, via an artificial intelligence engine, determining, via the artificial intelligence engine, if the authentication request is a misappropriation attempt based on at least one of the user characteristics and the user environment data, and performing an action comprising authenticating the user based on determining that the authentication request is not a misappropriation attempt or denying authentication of the user based on determining that the authentication request is a misappropriation attempt.

20 Claims, 5 Drawing Sheets

MISAPPROPRIATION ATTEMPT BLOCKING SYSTEM
300

NETWORK COMMUNICATION INTERFACE
310

PROCESSING DEVICE
320

MEMORY DEVICE
330

NETWORK PROVISIONING APPLICATION 340

MACHINE LEARNING MODELS 350

MISAPPROPRIATION ATTEMPT
IDENTIFICATION APPLICATION
360

MONITORING APPLICATION
370

CHARACTERISTICS BASELINE GENERATION
APPLICATION 380

NOTIFICATION APPLICATION
385

DATA REPOSITORY
390

500

IDENTIFY INITIATION OF AN AUTHENTICATION REQUEST FROM A USER DEVICE OF A USER
510

MONITOR AND RECORD ONE OR MORE USER CHARACTERISTICS VIA ONE OR MORE COMPONENTS OF THE USER DEVICE
520

CAPTURE USER ENVIRONMENT DATA OF THE USER, VIA THE ONE OR MORE COMPONENTS OF THE USER DEVICE
530

ANALYZE THE ONE OR MORE USER CHARACTERISTICS AND THE USER ENVIRONMENT DATA OF THE USER, VIA AN ARTIFICIAL INTELLIGENCE ENGINE
540

DETERMINE, VIA THE ARTIFICIAL INTELLIGENCE ENGINE, IF THE AUTHENTICATION REQUEST IS A MISAPPROPRIATION ATTEMPT BASED ON AT LEAST ONE OF THE ONE OR MORE USER CHARACTERISTICS AND THE USER ENVIRONMENT DATA
550

NO

YES

AUTHENTICATE THE USER BASED ON DETERMINING THAT THE AUTHENTICATION REQUEST IS NOT A MISAPPROPRIATION ATTEMPT
560

DENY AUTHENTICATION OF THE USER BASED ON DETERMINING THAT THE AUTHENTICATION REQUEST IS A MISAPPROPRIATION ATTEMPT
570

SYSTEM AND METHOD FOR IDENTIFYING AND BLOCKING SYNTHETIC MEDIA BASED MISAPPROPRIATION ATTEMPTS ASSOCIATED WITH ELECTRONIC COMMUNICATIONS

BACKGROUND

There exists a need for a system for identifying and blocking synthetic media based misappropriation attempts associated with electronic communications.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for identifying and blocking synthetic media based misappropriation attempts associated with electronic communications. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention identifies initiation of an authentication request from a user device of a user, monitors and records one or more user characteristics via one or more components of the user device, captures user environment data of the user, via the one or more components of the user device, analyzes the one or more user characteristics and the user environment data of the user, via an artificial intelligence engine, in response to analyzing the one or more user characteristics and the user environment data of the user, determines, via the artificial intelligence engine, if the authentication request is a misappropriation attempt based on at least one of the one or more user characteristics and the user environment data, and performs an action comprising authenticating the user based on determining that the authentication request is not a misappropriation attempt or denying authentication of the user based on determining that the authentication request is a misappropriation attempt.

In some embodiments, the present invention determines, via the artificial intelligence engine, if the authentication request is a misappropriation attempt based on extracting baseline characteristics of the user from a data repository, comparing the one or more user characteristics with the baseline characteristics of the user, and determining if any anomalies exist between the one or more user characteristics and the baseline characteristics.

In some embodiments, the present invention captures characteristics of the user over a time period before the initiation of the authentication request, generates the baseline characteristics based on the characteristics captured over the time period, and updates the baseline characteristics at regular time intervals or irregular time intervals.

In some embodiments, the present invention determines, via the artificial intelligence engine, if the authentication request is a misappropriation attempt based on extracting historical environment data of the user from a data repository, comparing the user environment data with the historical environment data of the user, and determining if any anomalies exist between the user environment data and the historical environment data.

In some embodiments, the present invention trains the artificial intelligence engine based on at least one of user information of the user, region-specific behavior data, database honeypots, historical unauthorized user data, and misinformation associated with the user that is collected from the user.

In some embodiments, the present invention prompts the user to provide the misinformation associated with characteristics of the user, receives the misinformation from the user, and stores the misinformation received from the user in a data repository.

In some embodiments, the present invention extracts the misinformation associated with the user from the data repository, feeds the misinformation to the artificial intelligence engine, and performs error correction and tuning of the artificial intelligence engine based on feeding the misinformation.

In some embodiments, the present invention scans for unauthorized user devices of unauthorized users linked with historical misappropriation attempts within a predefined distance of the user, via the one or more components of the user device, identifies at least one of the unauthorized user devices of the unauthorized users linked with historical misappropriation attempts within a predefined distance of the user, and transmits a notification to the user device associated with presence of the unauthorized user devices of the unauthorized users.

In some embodiments, the present invention transmits one or more notifications to the user device of the user based on analyzing the one or more user characteristics and the user environment data of the user to verify the analysis.

In some embodiments, one or more user characteristics comprise at least one of speech characteristics, text characteristics, and behavioral characteristics.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
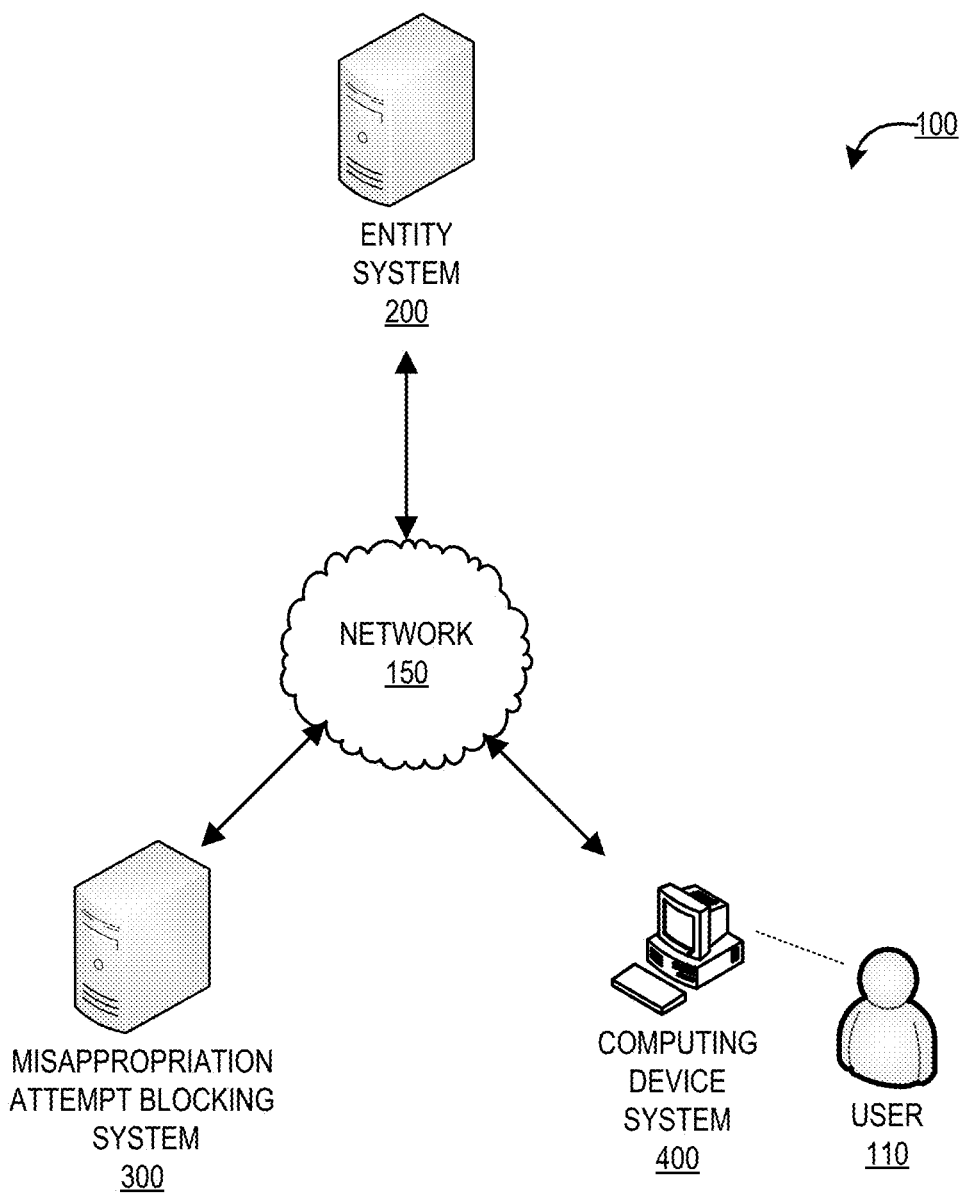
Figure 2:
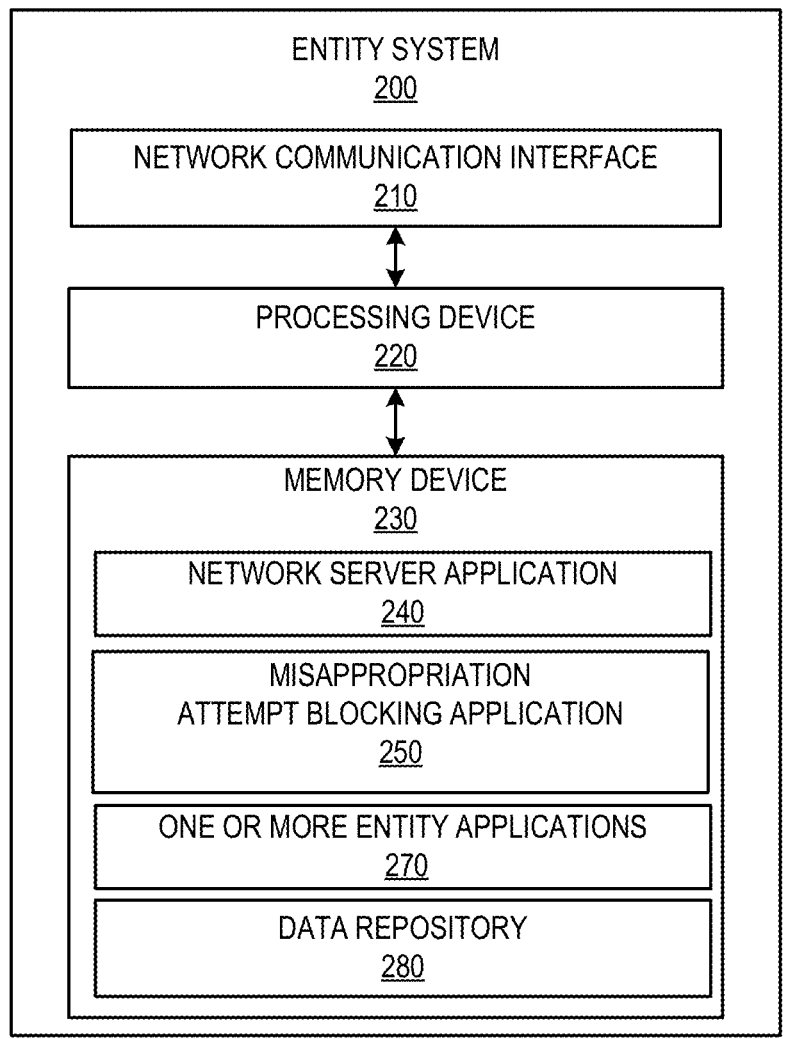
Figure 3:
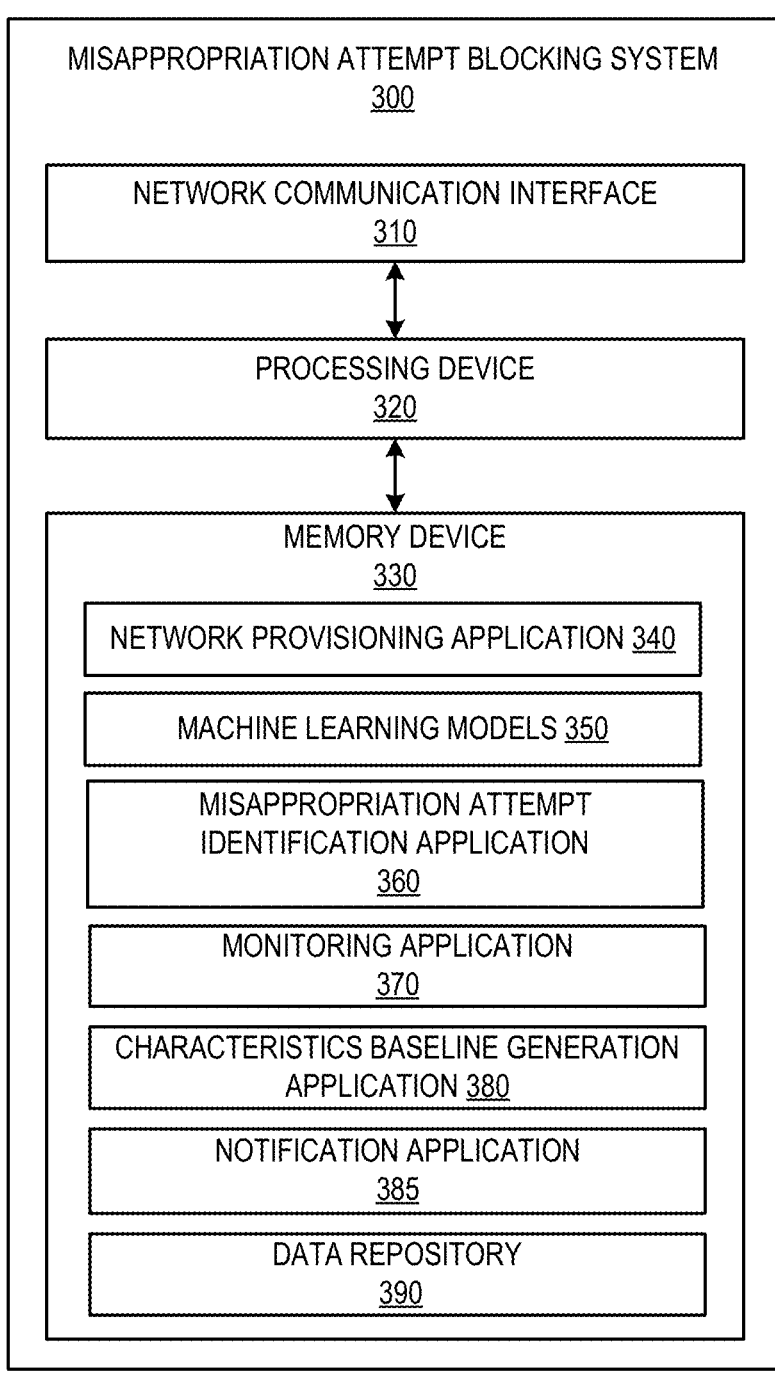
Figure 4:
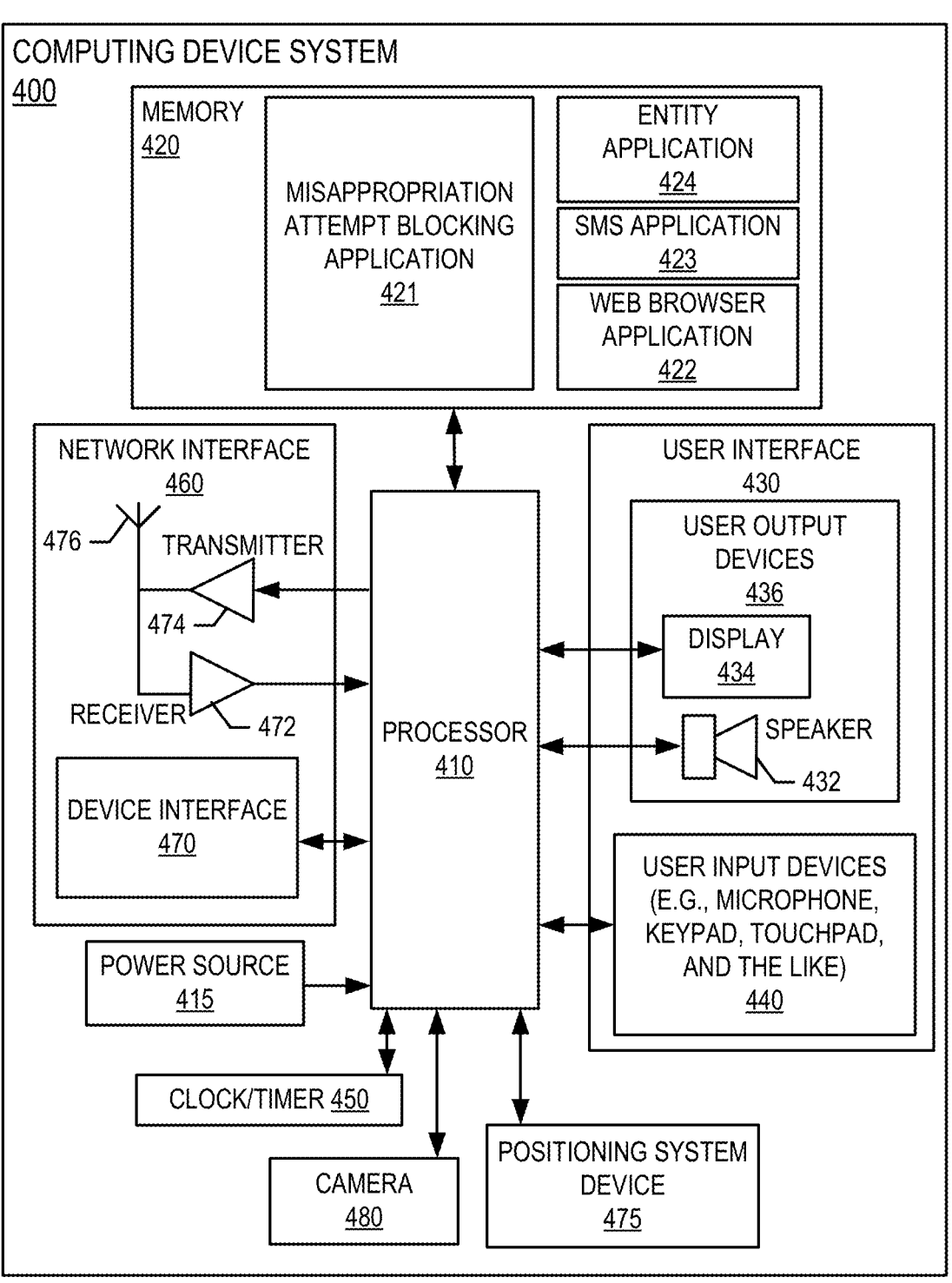

Having thus described embodiments of the invention in general terms, reference will now be made the accompanying drawings, wherein:

FIG. 1 provides a block diagram illustrating a system environment for identifying and blocking synthetic media based misappropriation attempts associated with electronic communications, in accordance with an embodiment of the invention;

FIG. 2 provides a block diagram illustrating the entity system 200 of FIG. 1, in accordance with an embodiment of the invention;

FIG. 3 provides a block diagram illustrating a misappropriation attempt blocking system 300 of FIG. 1, in accordance with an embodiment of the invention;

FIG. 4 provides a block diagram illustrating the computing device system 400 of FIG. 1, in accordance with an embodiment of the invention; and FIG. 5 provides a process flow for identifying and blocking synthetic media based misappropriation attempts associated with electronic communications, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As described herein, the term "entity" may be any organization that performs authentication of users to one or more entity resources (e.g., servers, systems, databases, applications, cloud services, and/or the like). In some embodiments, the entity may be a financial institution which may include herein may include any financial institutions such as commercial banks, thrifts, federal and state savings banks, savings and loan associations, credit unions, investment companies, insurance companies and the like. In some embodiments, the entity may be a non-financial institution. As described herein, a "user" may be an employee, a customer, or a potential customer of the entity.

As described herein, a "resource pool" or a "resource account" may be a checking account, savings account, money market account, business account, foreign currency account, brokerage accounts, retirement accounts, personal care account, cash management accounts, custodial accounts, and/or the like. In some embodiments, the resource pools associated with the user may be maintained and/or managed by the entity. In instances where the entity is a financial institution, the user may be a customer of the entity, where resource pools of the user are maintained and/or managed by the entity.

Many of the example embodiments and implementations described herein contemplate interactions engaged in by a user with a computing device and/or one or more communication devices and/or secondary communication devices. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

Remote identity verification is becoming increasingly difficult with developments in technology associated with generation of synthetic media to impersonate user's identity. As such, there exists a need for a system to identify and block synthetic media based misappropriation attempts associated with electronic communications.

FIG. 1 provides a block diagram illustrating a system environment 100 for identifying and blocking synthetic media based misappropriation attempts associated with electronic communications, in accordance with an embodiment of the invention. As illustrated in FIG. 1, the environment 100 includes a misappropriation attempt blocking system 300, an entity system 200, and a computing device system 400. One or more users 110 may be included in the system environment 100, where the users 110 interact with the other entities of the system environment 100 via a user interface of the computing device system 400. In some embodiments, the one or more user(s) 110 of the system environment 100 may be customers of an entity associated with the entity system 200. In some embodiments, the one or more users 110 may be potential customers of the entity associated with the entity system 200. In some embodiments, the one or more users 110 may be employees of the entity associated with the entity system 200.

The entity system(s) 200 may be any system owned or otherwise controlled by an entity to support or perform one or more process steps described herein. In some embodiments, the entity may be any organization that performs authentication of users to one or more entity resources (e.g., servers, systems, databases, applications, cloud services, and/or the like). In some embodiments, the entity is a financial institution. In some embodiments, the entity is a non-financial institution.

The misappropriation attempt blocking system 300 is a system of the present invention for performing one or more process steps described herein. In some embodiments, the misappropriation attempt blocking system 300 may be an independent system. In some embodiments, the misappropriation attempt blocking system 300 may be a part of the entity system 200. In some embodiments, the misappropriation attempt blocking system 300 may be controlled, owned, managed, and/or maintained by the entity associated with the entity system 200.

The misappropriation attempt blocking system 300, the entity system 200, and the computing device system 400 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the misappropriation attempt blocking system 300 is configured to communicate information or instructions with the entity system 200, and/or the computing device system 400 across the network 150.

The computing device system 400 may be a system owned or controlled by the entity of the entity system 200 and/or the user 110. As such, the computing device system 400 may be a computing device of the user 110. In general, the computing device system 400 communicates with the user 110 via a user interface of the computing device system 400, and in turn is configured to communicate information or instructions with the misappropriation attempt blocking system 300, and/or entity system 200 across the network 150.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution or a non-financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a misappropriation attempt blocking application 250, one or more entity applications 270, and a data repository 280. The one or more entity applications 270 may be any applications developed, supported, maintained, utilized, and/or controlled by the entity. The computer-executable program code of the network server application 240, the misappropriation attempt blocking application 250, the one or more entity application 270 to perform certain logic, data-extraction, and data-storing functions of the entity system 200 described herein, as well as communication functions of the entity system 200.

The network server application 240, the misappropriation attempt blocking application 250, and the one or more entity applications 270 are configured to store data in the data repository 280 or to use the data stored in the data repository 280 when communicating through the network communication interface 210 with the misappropriation attempt blocking system 300, and/or the computing device system 400 to perform one or more process steps described herein. In some embodiments, the entity system 200 may receive instructions from the misappropriation attempt blocking system 300 via the misappropriation attempt blocking application 250 to perform certain operations. The misappropriation attempt blocking application 250 may be provided by the misappropriation attempt blocking system 300. The one or more entity applications 270 may be any of the applications used, created, modified, facilitated, developed, and/or managed by the entity system 200.

FIG. 3 provides a block diagram illustrating the misappropriation attempt blocking system 300 in greater detail, in accordance with embodiments of the invention. As illustrated in FIG. 3, in one embodiment of the invention, the misappropriation attempt blocking system 300 includes one or more processing devices 320 operatively coupled to a network communication interface 310 and a memory device 330. In certain embodiments, the misappropriation attempt blocking system 300 is operated by an entity, such as a financial institution. In some embodiments, the misappropriation attempt blocking system 300 is owned or operated by the entity of the entity system 200. In some embodiments, the misappropriation attempt blocking system 300 may be an independent system. In alternate embodiments, the misappropriation attempt blocking system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the misappropriation attempt blocking system 300 described herein. For example, in one embodiment of the misappropriation attempt blocking system 300, the memory device 330 includes, but is not limited to, a network provisioning application 340, machine learning models 350, a misappropriation attempt identification application 360, a monitoring application 370, a characteristics baseline generation application 380, a notification application 385, and a data repository 390 comprising any data processed or accessed by one or more applications in the memory device 330. The computer-executable program code of the network provisioning application 340, the machine learning models 350, the misappropriation attempt identification application 360, the monitoring application 370, the characteristics baseline generation application 380, and the notification application 385 may instruct the processing device 320 to perform certain logic, data-processing, and data-storing functions of the misappropriation attempt blocking system 300 described herein, as well as communication functions of the misappropriation attempt blocking system 300.

The network provisioning application 340, the machine learning models 350, the misappropriation attempt identification application 360, the monitoring application 370, the characteristics baseline generation application 380, and the notification application 385 are configured to invoke or use the data in the data repository 390 when communicating through the network communication interface 310 with the entity system 200, and/or the computing device system 400. In some embodiments, the network provisioning application 340, the machine learning models 350, the misappropriation attempt identification application 360, the monitoring application 370, the characteristics baseline generation application 380, and the notification application 385 may store the data extracted or received from the entity system 200, and the computing device system 400 in the data repository 390. In some embodiments, the network provisioning application 340, the machine learning models 350, the misappropriation attempt identification application 360, the monitoring application 370, the characteristics baseline generation application 380, and the notification application 385 may be a part of a single application (e.g., modules).

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, a misappropriation attempt blocking application 421, entity application 424. These applications also typically instructions to a graphical user interface (GUI) on the display 430 that allows the user 110 to interact with the entity system 200, the misappropriation attempt blocking system 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the misappropriation attempt blocking application 421 provided by the misappropriation attempt blocking system 300 allows the user 110 to access the misappropriation attempt blocking system 300. In some embodiments, the entity application 424 provided by the entity system 200 and the misappropriation attempt blocking application 421 allow the user 110 to access the functionalities provided by the misappropriation attempt blocking system 300 and the entity system 200.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

FIG. 5 provides a flowchart 500 illustrating a process flow for identifying and blocking synthetic media based misappropriation attempts associated with electronic communications, in accordance with an embodiment of the invention. As shown in block 510, the system identifies initiation of an authentication request from a user device of a user. In some embodiments, the authentication request may be to access any resource that can be accessed via the user device. In some embodiments, the resource may be provided by an entity (e.g., a financial institution or a non-financial institution). In one example, the user may initiate an authentication request to access an online banking application. In another example, the user may initiate an authentication request to access an entertainment application. In some embodiments, the system may identify initiation of the authentication request based on continuously monitoring the user device. In other embodiments, the system may identify initiation of the authentication request based on receiving a notification or an alert from the resource. In some embodiments, the authentication request may be associated with an electronic communication initiated by the user. For example, the user may call an Interactive Voice Response (IVR) system to access information associated with a resource pool of a user and the system may authenticate the user first before providing information associated with the resource pool of the user via the IVR system. In another example, the user may initiate a chat with an associate or a chat bot to request sensitive information and the associate or the chat bot may authenticate the user before providing the information to the user.

As shown in block 520, the system monitors and records one or more user characteristics via one or more components of the user device. The one or more user characteristics may comprise at least one of speech characteristics, text characteristics, and behavioral characteristics. Speech characteristics may comprise tone, pitch, volume, speed, utterances, filler words, pronunciation, and/or the like. Text characteristics may comprise typing speed, spellings, keystrokes, words per minute, use of pictogram, logogram, ideogram, or smiley (e.g., emoji, emoticon, and/or the like), and/or the like. Behavioral characteristics may comprise fluency, use of vocabulary, accent, pronunciation, use of slang, communication skills, expressions, geographical region based behaviors comprising use of certain phrases and words, display of humor (e.g., jokes), and/or the like. In addition, in some embodiments, the system may also record and capture the interaction of the user with the user device, where the interaction may include, but is not limited to, any speech, text, and/or the like linked with the authentication request that is provided by the user, via the user device. As shown in block 530, the system captures user environment data of the user, via the one or more components of the user device. The user environment data may comprise background sounds and/or the like associated with the environment of the user. Capturing the user characteristics allows the system to differentiate between synthetic media based authentication attempts by unauthorized users and authentic attempts initiated by the user.

As shown in block 540, the system analyzes the one or more user characteristics and the user environment data of the user, via an artificial intelligence engine. The system may analyze the background noise, speech characteristics, text characteristics, behavioral characteristics, and interaction captured by the system in previous steps, via the artificial intelligence engine. The system may train the artificial intelligence engine based on at least one of user information of the user, geographic region-specific behavior data, database honeypots, historical unauthorized user data, and misinformation associated with the user that is collected from the user. In some embodiments, the system may collect the misinformation from the user. The system may prompt the user to provide the misinformation associated with characteristics of the user, receive the misinformation from the user, and store the misinformation received from the user in a data repository. The system, while training the artificial intelligence engine, may extract the misinformation associated with the user from the data repository, feed the misinformation to the artificial intelligence engine, and perform error correction and tuning of the artificial intelligence engine based on feeding the misinformation. For example, the system may provide misinformation to the artificial intelligence engine, may monitor if the artificial intelligence engine is accurately denying the authentication request or not, and may perform error correction and fine tuning of the artificial intelligence engine.

As shown in block 550, the system determines, via the artificial intelligence engine, if the authentication request is a misappropriation attempt based on at least one of the one or more user characteristics and the user environment data. In some embodiments, determining if the authentication request is a misappropriation attempt comprises extracting baseline characteristics of the user from a data repository, comparing the one or more user characteristics with the baseline characteristics of the user, and determining if any anomalies exist between the one or more user characteristics and the baseline characteristics. In some embodiments, the system may establish baseline characteristics based on capturing characteristics of the user over a time period before the initiation of the authentication request, generating the baseline characteristics based on the characteristics captured over the time period, and updating the baseline characteristics at regular time intervals or irregular time intervals. In some embodiments, determining if the authentication request is a misappropriation attempt comprises extracting historical environment data of the user from a data repository, comparing the user environment data with the historical environment data of the user, and determining if any anomalies exist between the user environment data and the historical environment data. If the system analyzes the one or more user characteristics and the user environment data and detects any anomalies, the system may transmit one or more notifications to the user device of the user to verify the analysis, where the notifications may further comprise additional questions to the user to verify the analysis. In one example, the system may analyze the background data to determine that the user is travelling and may push a notification to an online banking application to confirm the location. In another example, the system may analyze the captured speech of the user to determine that the pace is different from an established baseline and may transmit notifications with questions to further verify the user's identity.

If the system determines that the authentication request is not a misappropriation attempt, the process flow proceeds to block 560. As shown in block 560, the system authenticates the user based on determining that the authentication request is not a misappropriation attempt. If the system determines that the authentication request is a misappropriation attempt, the process flow proceeds to block 570. As shown in block 570, the system denies authentication of the user based on determining that the authentication request is a misappropriation attempt.

In some embodiments, the system may scan for unauthorized user devices of unauthorized users linked with historical misappropriation attempts within a predefined distance of the user, via the one or more components of the user device, identify at least one of the unauthorized user devices of the unauthorized users linked with historical misappropriation attempts within a predefined distance of the user, and transmit a notification to the user device associated with presence of the unauthorized user devices of the unauthorized users.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for identifying and blocking synthetic media based misappropriation attempts associated with electronic communications, the system comprising:
  at least one network communication interface;
  at least one non-transitory storage device; and
  at least one processing device coupled to the at least one non-transitory storage device and the at least one network communication interface, wherein the at least one processing device is configured to:
    identify initiation of an authentication request from a user device of a user;
    monitor and record one or more user characteristics via one or more components of the user device;
    capture user environment data of the user, via the one or more components of the user device;
    analyze the one or more user characteristics and the user environment data of the user, via an artificial intelligence engine;
    in response to analyzing the one or more user characteristics and the user environment data of the user, determine, via the artificial intelligence engine, if the authentication request is a misappropriation attempt based on at least one of the one or more user characteristics and the user environment data; and
    perform an action comprising:
      authenticating the user based on determining that the authentication request is not the misappropriation attempt; or
      denying authentication of the user based on determining that the authentication request is the misappropriation attempt.

2. The system of claim 1, wherein the at least one processing device is configured to determine, via the artificial intelligence engine, if the authentication request is the misappropriation attempt based on:
  extracting baseline characteristics of the user from a data repository;
  comparing the one or more user characteristics with the baseline characteristics of the user; and
  determining if any anomalies exist between the one or more user characteristics and the baseline characteristics.

3. The system of claim 2, wherein the at least one processing device is configured to:
  capture characteristics of the user over a time period before the initiation of the authentication request;
  generate the baseline characteristics based on the characteristics captured over the time period; and
  update the baseline characteristics at regular time intervals or irregular time intervals.

4. The system of claim 1, wherein the at least one processing device is configured to determine, via the artificial intelligence engine, if the authentication request is the misappropriation attempt based on:
  extracting historical environment data of the user from a data repository;
  comparing the user environment data with the historical environment data of the user; and determining if any anomalies exist between the user environment data and the historical environment data.

5. The system of claim 1, wherein the at least one processing device is configured to train the artificial intelligence engine based on at least one of user information of the user, region-specific behavior data, database honeypots, historical unauthorized user data, and misinformation associated with the user that is collected from the user.

6. The system of claim 5, wherein the at least one processing device is configured to:
  prompt the user to provide the misinformation associated with characteristics of the user;
  receive the misinformation from the user; and
  store the misinformation received from the user in a data repository.

7. The system of claim 6, wherein the at least one processing device is configured to:
  extract the misinformation associated with the user from the data repository;
  feed the misinformation to the artificial intelligence engine; and
  perform error correction and tuning of the artificial intelligence engine based on feeding the misinformation.

8. The system of claim 1, wherein the at least one processing device is configured to:
  scan for unauthorized user devices of unauthorized users linked with historical misappropriation attempts within a predefined distance of the user, via the one or more components of the user device;
  identify at least one of the unauthorized user devices of the unauthorized users linked with historical misappropriation attempts within a predefined distance of the user; and
  transmit a notification to the user device associated with presence of the unauthorized user devices of the unauthorized users.

9. The system of claim 1, wherein the at least one processing device is configured to transmit one or more notifications to the user device of the user based on analyzing the one or more user characteristics and the user environment data of the user to verify the analysis.

10. The system of claim 1, wherein the one or more user characteristics comprise at least one of speech characteristics, text characteristics, and behavioral characteristics.

11. A computer program product for identifying and blocking synthetic media based misappropriation attempts associated with electronic communications, the computer program product comprising a non-transitory computer-readable storage medium having computer executable instructions for causing a computer processor to perform the steps of:
  identifying initiation of an authentication request from a user device of a user;
  monitoring and recording one or more user characteristics via one or more components of the user device;
  capturing user environment data of the user, via the one or more components of the user device;
  analyzing the one or more user characteristics and the user environment data of the user, via an artificial intelligence engine;
  in response to analyzing the one or more user characteristics and the user environment data of the user, determining, via the artificial intelligence engine, if the authentication request is a misappropriation attempt based on at least one of the one or more user characteristics and the user environment data; and
  performing an action comprising:

authenticating the user based on determining that the authentication request is not the misappropriation attempt; or denying authentication of the user based on determining that the authentication request is the misappropriation attempt.

12. The computer program product of claim 11, wherein the computer executable instructions cause the computer processor to perform the step of determining, via the artificial intelligence engine, if the authentication request is the misappropriation attempt based on:

extracting baseline characteristics of the user from a data repository;

comparing the one or more user characteristics with the baseline characteristics of the user; and determining if any anomalies exist between the one or more user characteristics and the baseline characteristics.

13. The computer program product of claim 11, wherein the computer executable instructions cause the computer processor to perform the step of determining, via the artificial intelligence engine, if the authentication request is the misappropriation attempt based on:

extracting historical environment data of the user from a data repository;

comparing the user environment data with the historical environment data of the user; and determining if any anomalies exist between the user environment data and the historical environment data.

14. The computer program product of claim 11, wherein the computer executable instructions cause the computer processor to perform the step of training the artificial intelligence engine based on at least one of user information of the user, region-specific behavior data, database honeypots, historical unauthorized user data, and misinformation associated with the user that is collected from the user.

15. The computer program product of claim 11, wherein the computer executable instructions cause the computer processor to perform the steps of:

scanning for unauthorized user devices of unauthorized users linked with historical misappropriation attempts within a predefined distance of the user, via the one or more components of the user device;

identifying at least one of the unauthorized user devices of the unauthorized users linked with historical misappropriation attempts within a predefined distance of the user; and transmitting a notification to the user device associated with presence of the unauthorized user devices of the unauthorized users.

16. A computer implemented method for identifying and blocking synthetic media based misappropriation attempts associated with electronic communications, wherein the method comprises:

identifying initiation of an authentication request from a user device of a user;

monitoring and recording one or more user characteristics via one or more components of the user device;

capturing user environment data of the user, via the one or more components of the user device;

analyzing the one or more user characteristics and the user environment data of the user, via an artificial intelligence engine;

in response to analyzing the one or more user characteristics and the user environment data of the user, determining, via the artificial intelligence engine, if the authentication request is a misappropriation attempt based on at least one of the one or more user characteristics and the user environment data; and performing an action comprising:

authenticating the user based on determining that the authentication request is not the misappropriation attempt; or denying authentication of the user based on determining that the authentication request is the misappropriation attempt.

17. The computer implemented method of claim 16, wherein determining, via the artificial intelligence engine, if the authentication request is the misappropriation attempt is based on:

extracting baseline characteristics of the user from a data repository;

comparing the one or more user characteristics with the baseline characteristics of the user; and determining if any anomalies exist between the one or more user characteristics and the baseline characteristics.

18. The computer implemented method of claim 16, wherein determining, via the artificial intelligence engine, if the authentication request is the misappropriation attempt is based on:

extracting historical environment data of the user from a data repository;

comparing the user environment data with the historical environment data of the user; and determining if any anomalies exist between the user environment data and the historical environment data.

19. The computer implemented method of claim 16, wherein the method comprises training the artificial intelligence engine based on at least one of user information of the user, region-specific behavior data, database honeypots, historical unauthorized user data, and misinformation associated with the user that is collected from the user.

20. The computer implemented method of claim 16, wherein the method comprises:

scanning for unauthorized user devices of unauthorized users linked with historical misappropriation attempts within a predefined distance of the user, via the one or more components of the user device;

identifying at least one of the unauthorized user devices of the unauthorized users linked with historical misappropriation attempts within a predefined distance of the user; and transmitting a notification to the user device associated with presence of the unauthorized user devices of the unauthorized users.

* * * * *